US008491373B2

(12) United States Patent
Locke

(10) Patent No.: US 8,491,373 B2
(45) Date of Patent: Jul. 23, 2013

(54) GAMING MACHINE WITH RISK/REWARD FEATURE

(75) Inventor: David K. Locke, Des Plaines, IL (US)

(73) Assignee: WMS Gaming Inc., Waukegan, IL (US)

( * ) Notice: Subject to any disclaimer, the term of this patent is extended or adjusted under 35 U.S.C. 154(b) by 2504 days.

(21) Appl. No.: 10/140,601

(22) Filed: May 7, 2002

(65) Prior Publication Data

US 2003/0211880 A1 Nov. 13, 2003

(51) Int. Cl.
*A63F 9/24* (2006.01)
*A63F 13/00* (2006.01)

(52) U.S. Cl.
USPC ................... 463/20; 463/16; 463/21; 463/25; 463/29; 463/42; 273/138.1; 273/138.2; 273/143 R

(58) Field of Classification Search
USPC . 463/16–21, 23, 25, 29, 14, 42; 273/138.1–2, 273/143 R, 292; 705/23
See application file for complete search history.

(56) References Cited

U.S. PATENT DOCUMENTS 5,931,467 A * 8/1999 Kamille ........................ 273/139
6,015,346 A 1/2000 Bennett ........................... 463/20
6,059,289 A 5/2000 Vancura .................... 273/143 R
6,089,976 A 7/2000 Schneider et al. .............. 463/16
6,190,255 B1 2/2001 Thomas et al. ................. 463/20
6,312,334 B1 * 11/2001 Yoseloff ........................... 463/25
6,375,187 B1 * 4/2002 Baerlocher ............... 273/143 R
6,599,192 B1 * 7/2003 Baerlocher et al. ............. 463/25

FOREIGN PATENT DOCUMENTS

GB 2144644 A * 3/1985
WO WO 00/17832 3/2000

OTHER PUBLICATIONS

Article, "Betting On Memories", *Strictly Slots,* Apr. 1999, pp. 66-67.
Article, "The Full Monty", *Strictly Slots,* Jun. 1999, pp. 48-50.
Article, "Three Wishes", *Strictly Slots,* Nov. 2000, p. 43.
Article, "Come On Down!", *Strictly Slots,* Jul. 2001, pp. 56-62.
Article, "Evel Knievel", *Strictly Slots,* Nov. 2001, p. 32.
Article, "Deep Pockets", *Strictly Slots,* Mar. 2002, p. 47.

* cited by examiner

*Primary Examiner* — Dmitry Suhol
*Assistant Examiner* — Ryan Hsu
(74) *Attorney, Agent, or Firm* — Nixon Peabody LLP

(57) ABSTRACT

A wagering game is conducted on a gaming machine in response to a wager from a player. In addition to a basic game, such as a slot game, the wagering game includes a risk/reward feature that accumulates awards over a plurality of rounds. The risk/reward feature allows the player to risk any of the awards accumulated during a current round in exchange for a possibility of "banking" the current round's awards and advancing to a next round. Regardless of whether the player undertakes the risk, the player is allowed to retain any of the awards accumulated during prior rounds.

10 Claims, 10 Drawing Sheets

GAMING MACHINE WITH RISK/REWARD FEATURE

FIELD OF THE INVENTION

The present invention relates generally to gaming machines and, more particularly, to a gaming machine including a risk/reward feature that allows a player to accumulate awards over multiple rounds but risk any awards accumulated during a current round.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Shrewd operators consequently strive to employ the most entertaining and exciting machines available because such machines attract frequent play and hence increase profitability to the operator. Accordingly, in the competitive gaming machine industry, there is a continuing need for gaming machine manufacturers to produce new types of games, or enhancements to existing games, which will attract frequent play by enhancing the entertainment value and excitement associated with the game.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome of the basic game. Because the bonus game concept offers tremendous advantages in player appeal and excitement relative to other known games, and because such games are attractive to both players and operators, there is a continuing need to develop new features and themes for bonus games to satisfy the demands of players and operators. Preferably, such new bonus game features and themes will maintain, or even further enhance, the level of player excitement offered by bonus games heretofore known in the art. The present invention is directed to satisfying these needs.

SUMMARY OF THE INVENTION

A wagering game is conducted on a gaming machine in response to a wager from a player. In addition to a basic game, such as a slot game, the wagering game includes a risk/reward feature that accumulates awards over a plurality of rounds. The risk/reward feature allows the player to risk any of the awards accumulated during a current round in exchange for a possibility of "banking" the current round's awards and advancing to a next round. Regardless of whether the player undertakes the risk, the player is allowed to retain any of the awards accumulated during prior rounds.

BRIEF DESCRIPTION OF THE DRAWINGS

The foregoing and other advantages of the invention will become apparent upon reading the following detailed description and upon reference to the drawings in which.

Figure 1:
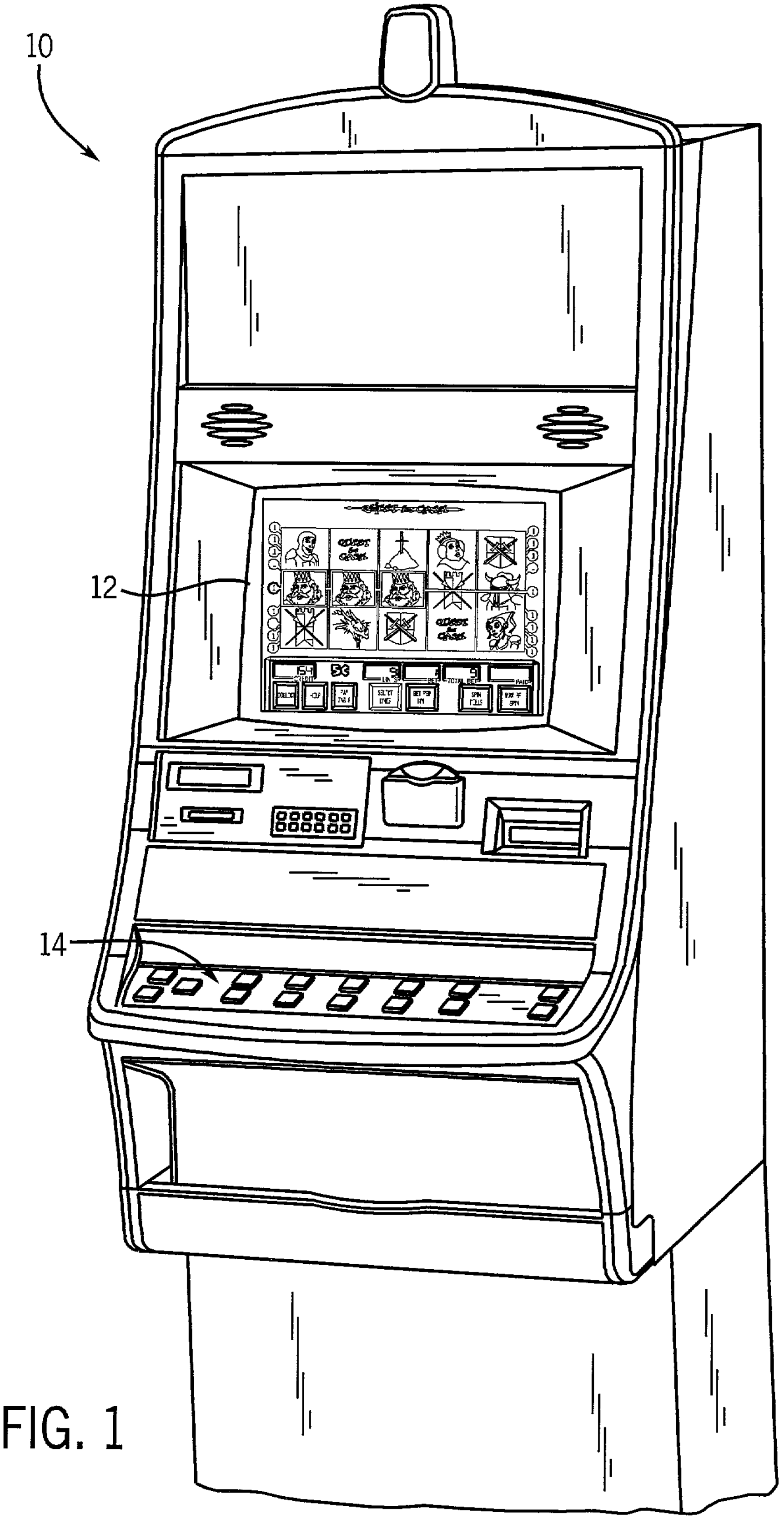
FIG. 1 is a perspective view of a gaming machine embodying the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

Turning now to the drawings and referring initially to FIG. 1, a gaming machine 10 is operable to play a wagering game having a theme of knights, dragons, and damsels. The wagering game features a basic slot game with five simulated spinning reels and a risk/reward bonus feature triggered by a start-feature outcome in the basic slot game. In addition to the risk/reward feature, the basic slot game may produce certain outcomes for triggering other special features and bonus games.

The gaming machine 10 includes a visual display 12 preferably in the form of a dot matrix, CRT, LED, LCD, electro-luminescent, or other type of video display known in the art. The display 12 preferably includes a touch screen overlaying the monitor. In the illustrated embodiment, the gaming machine 10 is an "upright" version in which the display 12 is oriented vertically relative to the player. Alternatively, the gaming machine may be a "slant-top" version in which the display 12 is slanted at about a thirty-degree angle toward the player of the gaming machine 10.

Figure 2:
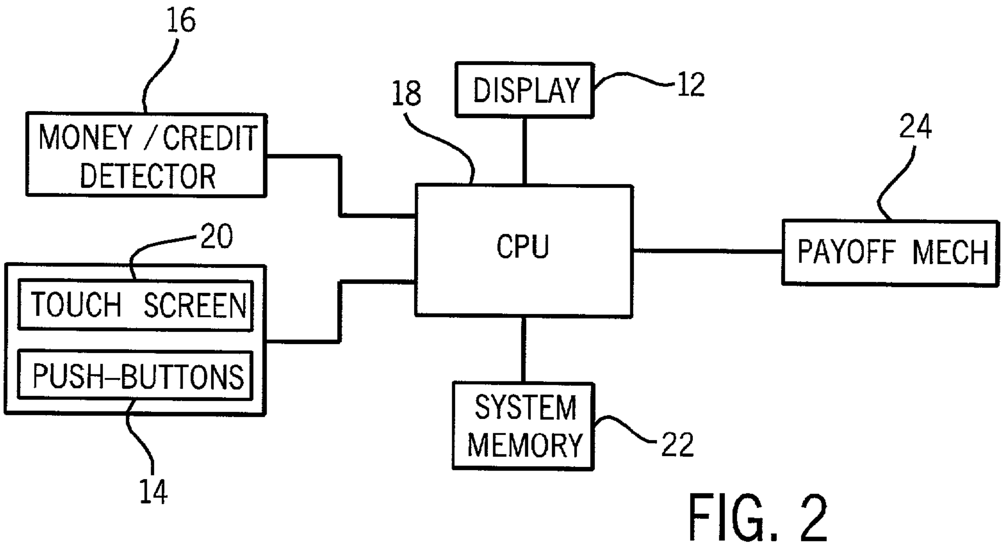
FIG. 2 is a block diagram of a control system suitable for operating the gaming machine.

FIG. 2 is a block diagram of a control system suitable for operating the gaming machine 10. Money/credit detector 16 signals a central processing unit ("CPU") 18 when a player has inserted money or played a number of credits. The money may be provided by coins, bills, tickets, coupons, cards, etc. Then, the CPU 18 operates to execute a game program that causes the display 12 to display five simulated symbol-bearing reels. The player may select a number of pay lines to play, an amount to wager, and start game play via the touch screen 20 or the push-buttons 14, causing the CPU 18 to set the reels in motion, randomly select a game outcome, and then stop the reels to display symbols corresponding to the pre-selected game outcome. In one embodiment, one of the basic game outcomes triggers a risk/reward bonus feature.

A system memory 22 stores control software, operational instructions and data associated with the gaming machine 10. In one embodiment, the system memory 22 comprises a separate read-only memory (ROM) and battery-backed random-access memory (RAM). However, it will be appreciated that the system memory 22 may be implemented on any of several alternative types of memory structures or may be implemented on a single memory structure. A payoff mechanism 24 is operable in response to instructions from the CPU 18 to award a payoff to the player in response to certain winning outcomes that might occur in the basic game or the risk/reward bonus feature. The payoff may be provided in the form of coins, bills, tickets, coupons, cards, etc. The payoff amounts are determined by one or more pay tables stored in the system memory 22.

Figure 3:
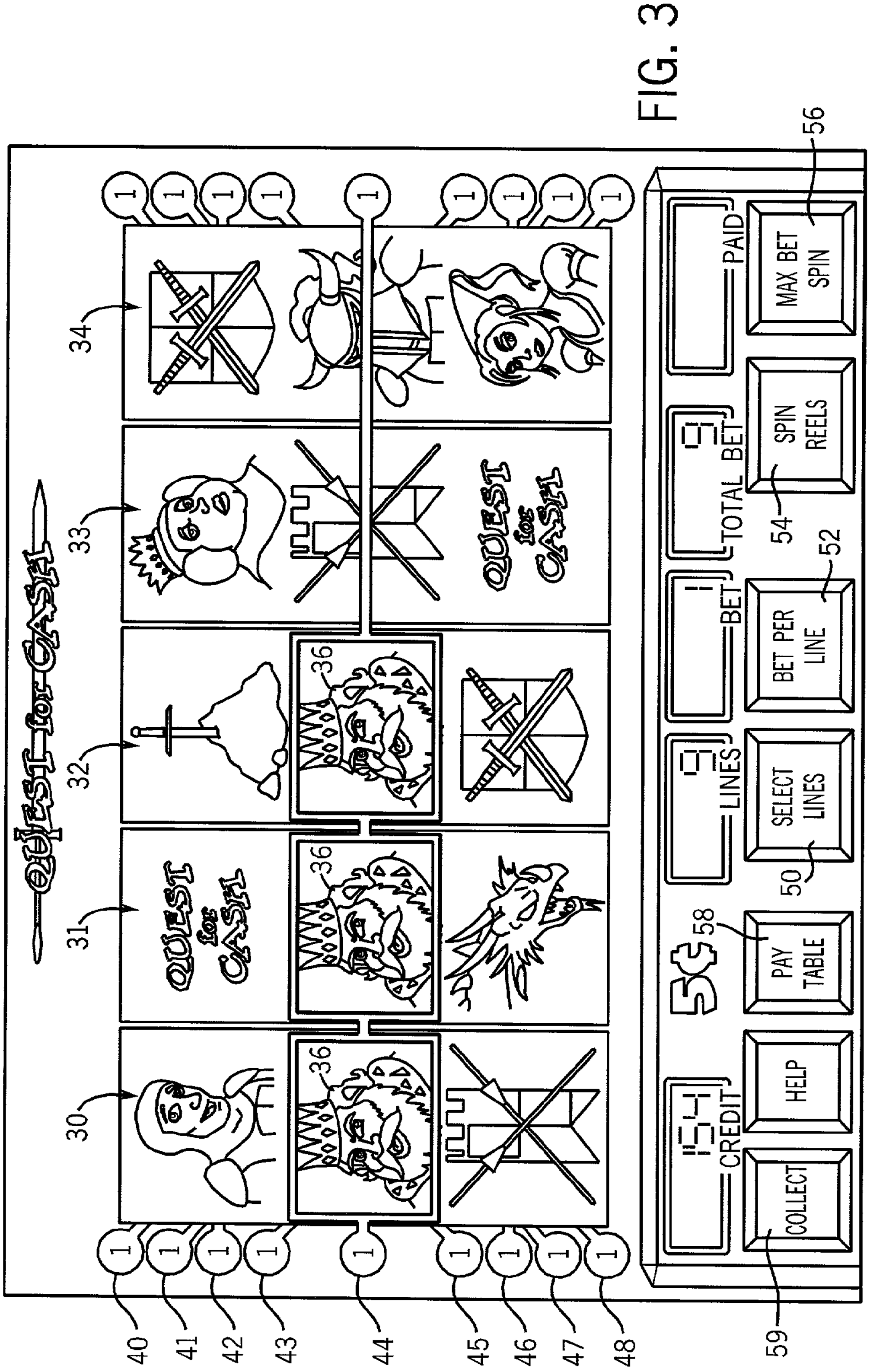
FIG. 3 is a display image associated with a basic slot game and showing a symbol combination for triggering a risk/reward bonus feature.

Referring to FIG. 3, the basic game is implemented on the display 12 on five video simulated spinning reels 30-34 with nine pay lines 40-48. Each of the pay lines 40-48 extends through one symbol on each of the five reels 30-34. Generally, game play is initiated by inserting money or playing a number of credits, causing the CPU to activate a number of pay lines corresponding to the amount of money or number of credits played. In one embodiment, the player selects the number of pay lines (between one and nine) to play by pressing a "Select Lines" key 50 on the video display 12. The player then chooses the number of coins or credits to bet on the selected pay lines by pressing the "Bet Per Line" key 52.

After activation of the pay lines, the reels 30-34 may be set in motion by touching the "Spin Reels" key 54 or, if the player wishes to bet the maximum amount per line, by using the "Max Bet Spin" key 56 on the video display 12. Alternatively, other mechanisms such as, for example, a lever or push button may be used to set the reels in motion. The CPU uses a random number generator to select a game outcome (e.g., "basic" game outcome) corresponding to a particular set of reel "stop positions." The CPU then causes each of the video reels 30-34 to stop at the appropriate stop position. Video symbols are displayed on the reels 30-34 to graphically illustrate the reel stop positions and indicate whether the stop positions of the reels represent a winning game outcome.

Winning basic game outcomes (e.g., symbol combinations resulting in payment of coins or credits) are identifiable to the player by a pay table. In one embodiment, the pay table is affixed to the machine 10 and/or displayed by the video display 12 in response to a command by the player (e.g., by pressing the "Pay Table" button 58). A winning basic game outcome occurs when the symbols appearing on the reels 30-34 along an active pay line correspond to one of the winning combinations on the pay table. A winning combination, for example, could be three or more matching symbols along an active pay line, where the award is greater as the number of matching symbols along the active pay line increases. If the displayed symbols stop in a winning combination, the game credits the player an amount corresponding to the award in the pay table for that combination multiplied by the amount of credits bet on the winning pay line. The player may collect the amount of accumulated credits by pressing the "Collect" button 59. In one implementation, the winning combinations start from the first reel 30 (left to right) and span adjacent reels. In an alternative implementation, the winning combinations start from either the first reel 30 (left to right) or the fifth reel 34 (right to left) and span adjacent reels.

Included among the plurality of basic game outcomes is a start-feature outcome for triggering play of a risk/reward bonus feature. A start-feature outcome may be defined in any number of ways. For example, a start-feature outcome occurs when a special start-feature symbol or a special combination of symbols appears on one or more of the reels 30-34. The start-feature outcome may require the combination of symbols to appear along an active pay line, or may alternatively require that the combination of symbols appear anywhere on the display regardless of whether the symbols are along an active pay line. The appearance of the appropriate start-feature outcome causes the CPU to shift operation from the basic game to the risk/reward bonus feature of the present invention. In the embodiment illustrated in FIG. 3, the appearance of three KING symbols 36 along an active payline triggers a risk/reward bonus feature.

Figure 4:
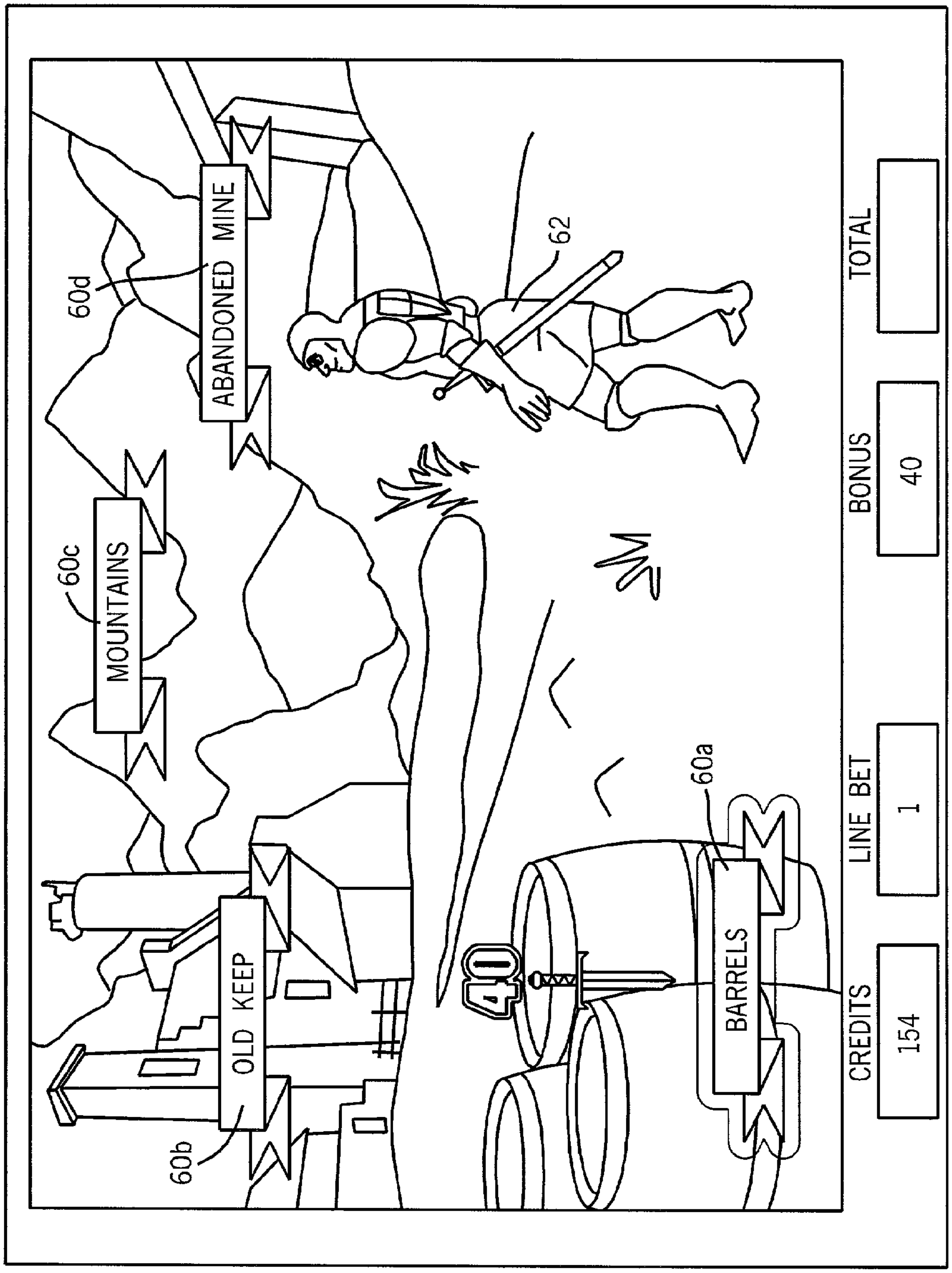
FIGS. 4 through 10 are display images associated with the risk/reward feature.

Referring to FIG. 4, the risk/reward bonus feature accumulates awards over a plurality of rounds. Each round is represented by a different outdoor scene containing a plurality of elements 60 selectable by the player. The elements 60 may, for example, include caves, bridges, trees, huts, towers, land or water areas, and ruins. These elements 60 are associated with either a non-risk outcome or a risk outcome. On the one hand, a non-risk outcome generally yields an award (e.g., "treasure") in the form of a number of credits or a multiplier applied to the player's initial total wager. On the other hand, a risk outcome requires the player to decide whether or not to undertake a risk whereby the player would risk any of the awards accumulated during a current round in exchange for a possibility of "banking" the current round's awards and advancing to a next round. Regardless of whether the player undertakes the risk, the player is allowed to retain any of the awards accumulated during prior rounds such that awards from prior rounds are not risked.

A risk outcome yields three possible scenarios. First, if the player does not undertake the risk, i.e., quits the risk/reward feature, the CPU awards any of the awards accumulated during both the current round and prior rounds and then shifts operation back to the basic slot game. Second, if the player undertakes the risk and the risk, in turn, yields a successful outcome, the CPU "banks" the current round's awards and advances to a next round. Third, if the player undertakes the risk and the risk, in turn, yields an unsuccessful outcome, the CPU eliminates (i.e., takes back) any of the awards accumulated during the current round and then shifts operation back to the basic slot game.

If the player undertakes the risk after selecting an element associated with a risk outcome, the risk is portrayed as an animated fight between a good character 62 (e.g., White Knight) and an enemy character. The player adopts the role of the White Knight 62. The risk yields a successful outcome if the White Knight 62 defeats an enemy character, and yields an unsuccessful outcome if an enemy character defeats the White Knight 62. Because the present invention may be implemented with themes not involving knights, dragons, and damsels, the risk may be portrayed by means other than an animated fight between characters.

Figure 5:
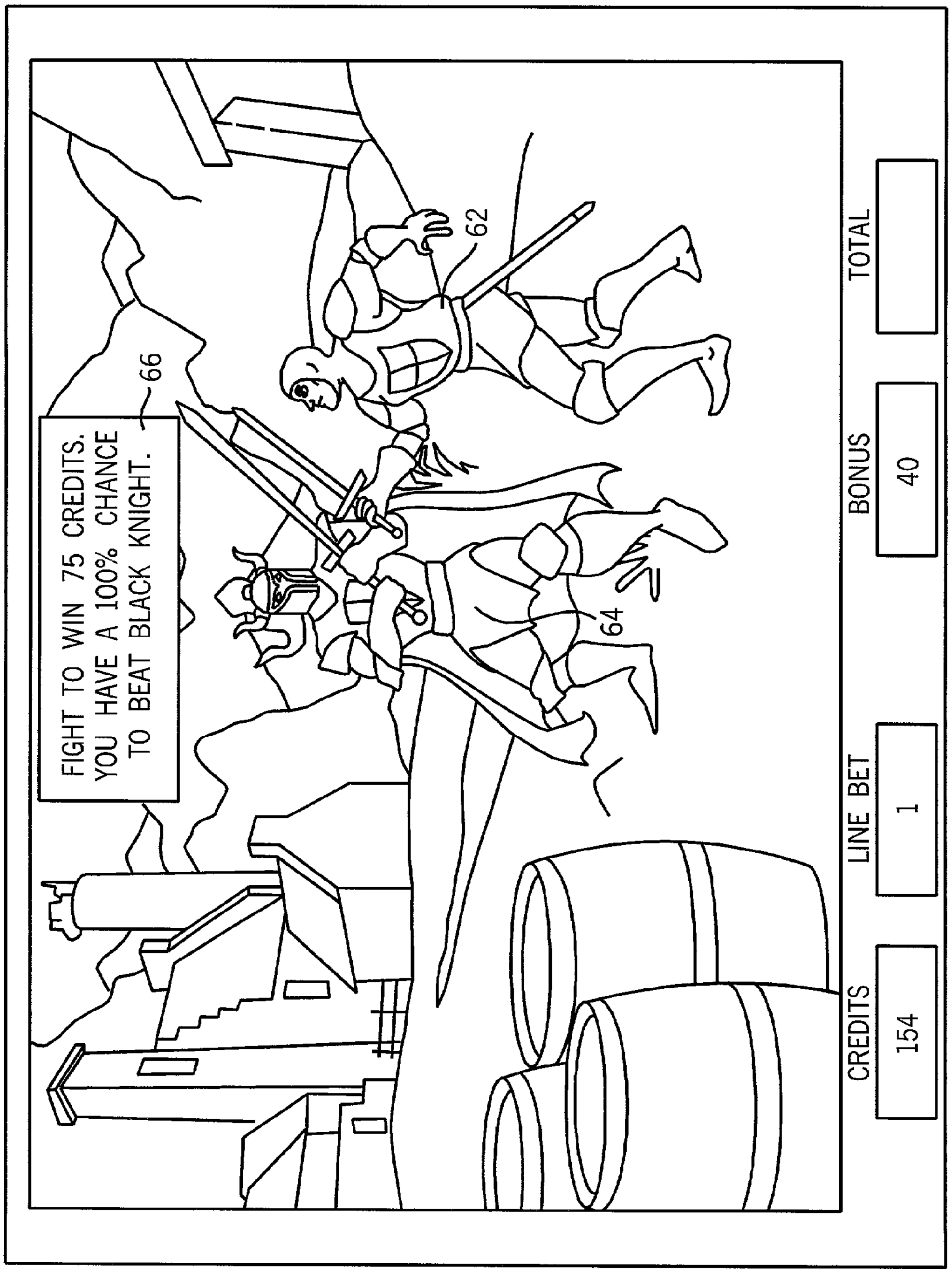

FIGS. 4 through 10 are display images illustrating an example of how the risk/reward feature is conducted. Referring to FIGS. 4 and 5, in a first round the display depicts an outdoor scene including such selectable elements 60 as barrels 60*a*, an old keep 60*b*, mountains 60*c*, and an abandoned mine 60*d*. The player selects the barrels 60*a* in FIG. 4, which yields an award of 40 credits. The player then selects the mountains 60*c* in FIG. 5, which allows the player to either (1) quit the risk/reward feature and keep the current round's accumulated award of 40 credits, or (2) risk the current round's accumulated award of 40 credits in exchange for the possibility of accumulating another 75 credits, "banking" any awards accumulated during the current round (e.g., 115 credits), and advancing to the next round. To assist the player in making an informed decision, the display preferably includes a window 66 indicating the number of credits that can be won and the probability that the risk will yield a successful outcome, i.e., the White Knight 62 will defeat an enemy character 64 such as a Black Knight. This probability is preferably 100 percent in the first round. Therefore, the player should always undertake the risk and fight the enemy character 64 in the first round.

Figure 6:
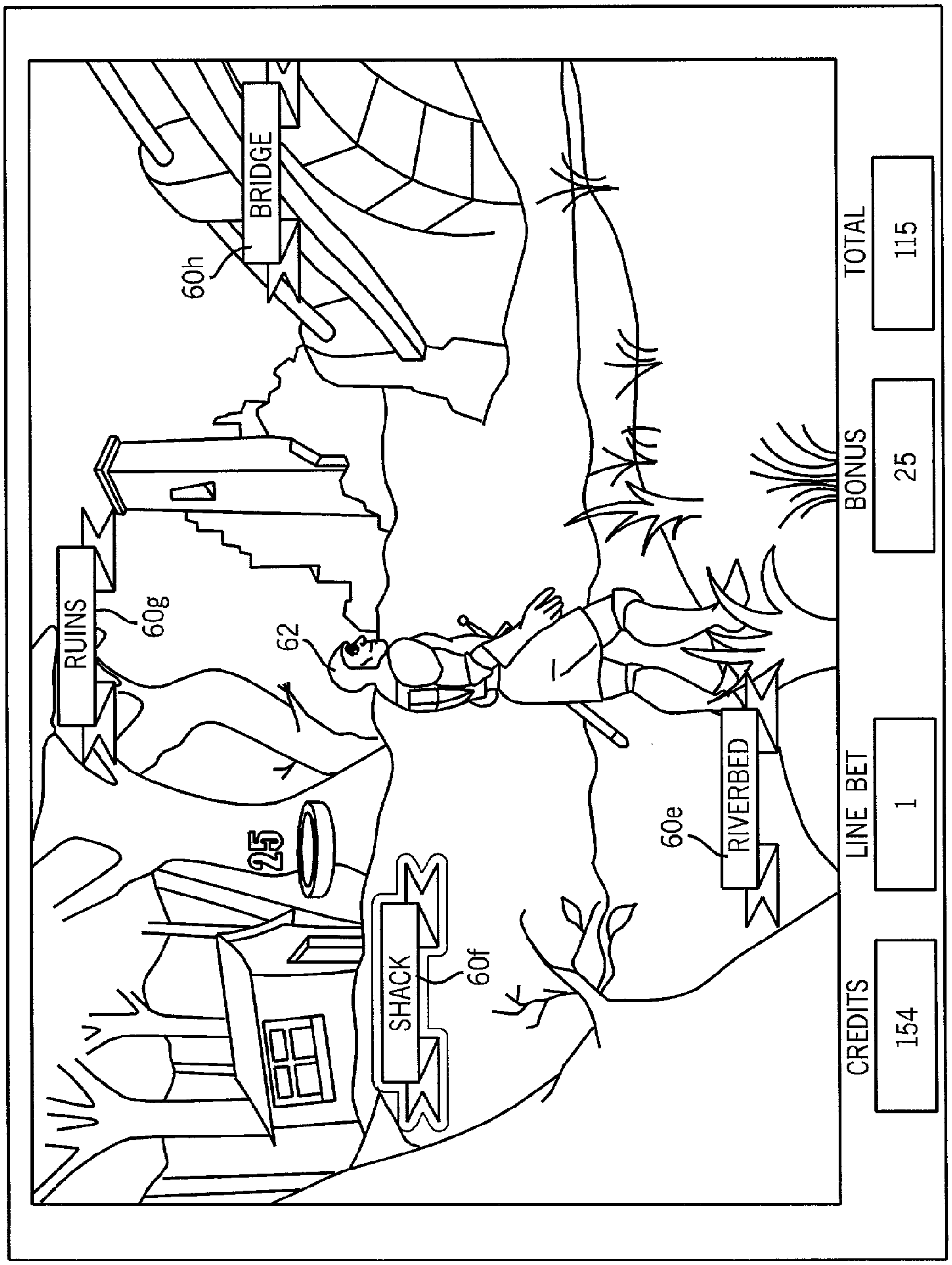
Figure 7:
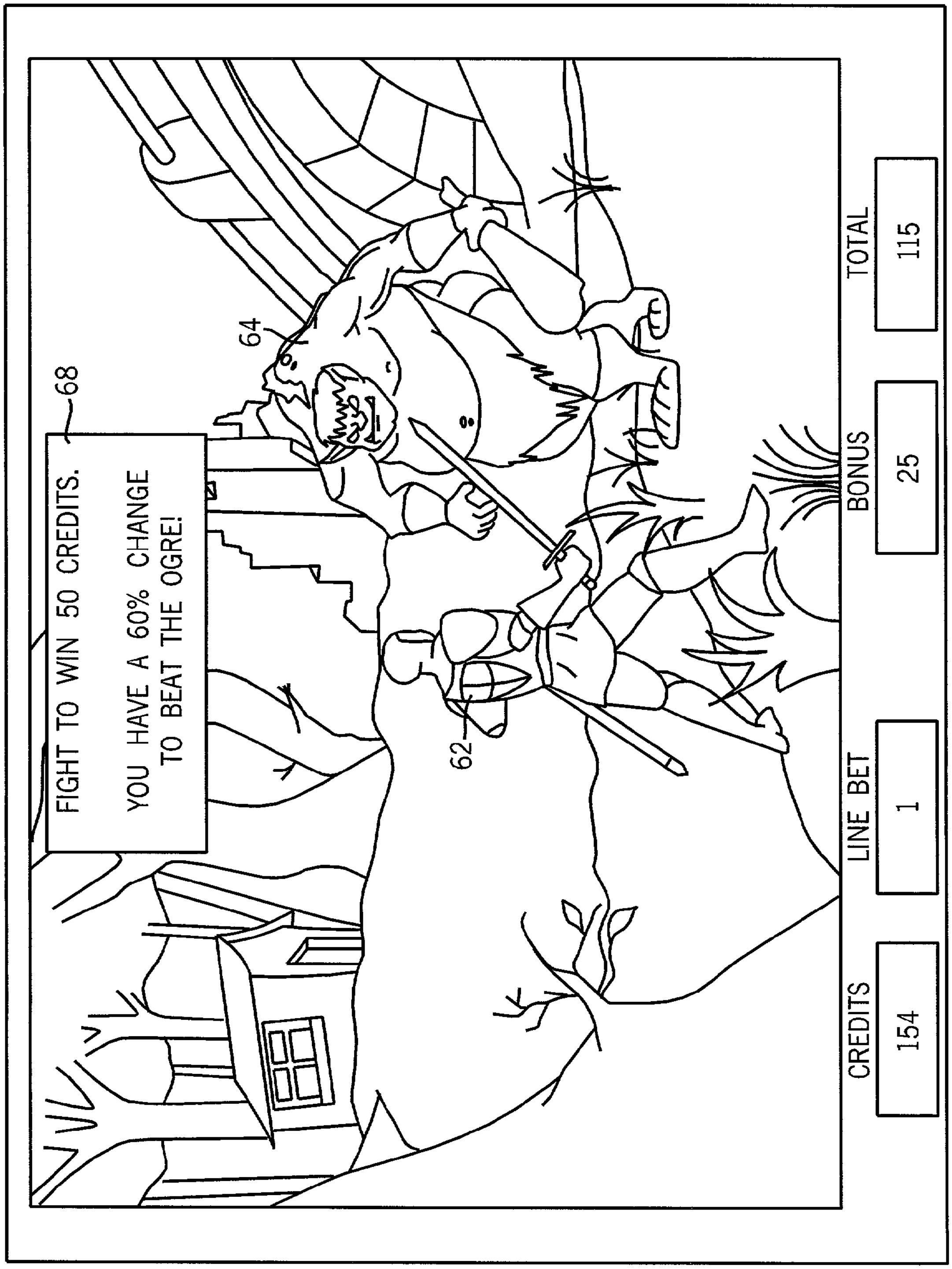

If the player undertakes the risk and the White Knight 62 therefore defeats the enemy character 64 in the first round (assuming the probability is set to 100 percent), the risk/reward feature advances to a second round shown in FIGS. 6 and 7. In the second round the display depicts another outdoor scene including such selectable elements 60 as a riverbed 60*e,* a shack 60*f,* ruins 60*g,* and a bridge 60*h.* The player selects the shack 60*f* in FIG. 6, which yields an award of 25 credits. The player then selects the bridge 60*h* in FIG. 7, which allows the player to either (1) quit the risk/reward feature and keep the current round's accumulated award of 25 credits, or (2) risk the current round's accumulated award of 25 credits in exchange for the possibility of accumulating another 50 credits, "banking" any awards accumulated during the current round (e.g., 75 credits), and advancing to the next round. Again, the display preferably includes a window 68 indicating the number of credits that can be won and the probability that the risk will yield a successful outcome, i.e., the White Knight 62 will defeat an enemy character 64 such as an ogre. This probability preferably decreases with each successive round as the enemy characters becomes "tougher" and, in the example, is shown to be 60 percent in the second round. As the probability that the risk will yield a successful outcome decreases, the number of credits that can be won by undertaking the risk may increase.

Figure 8:
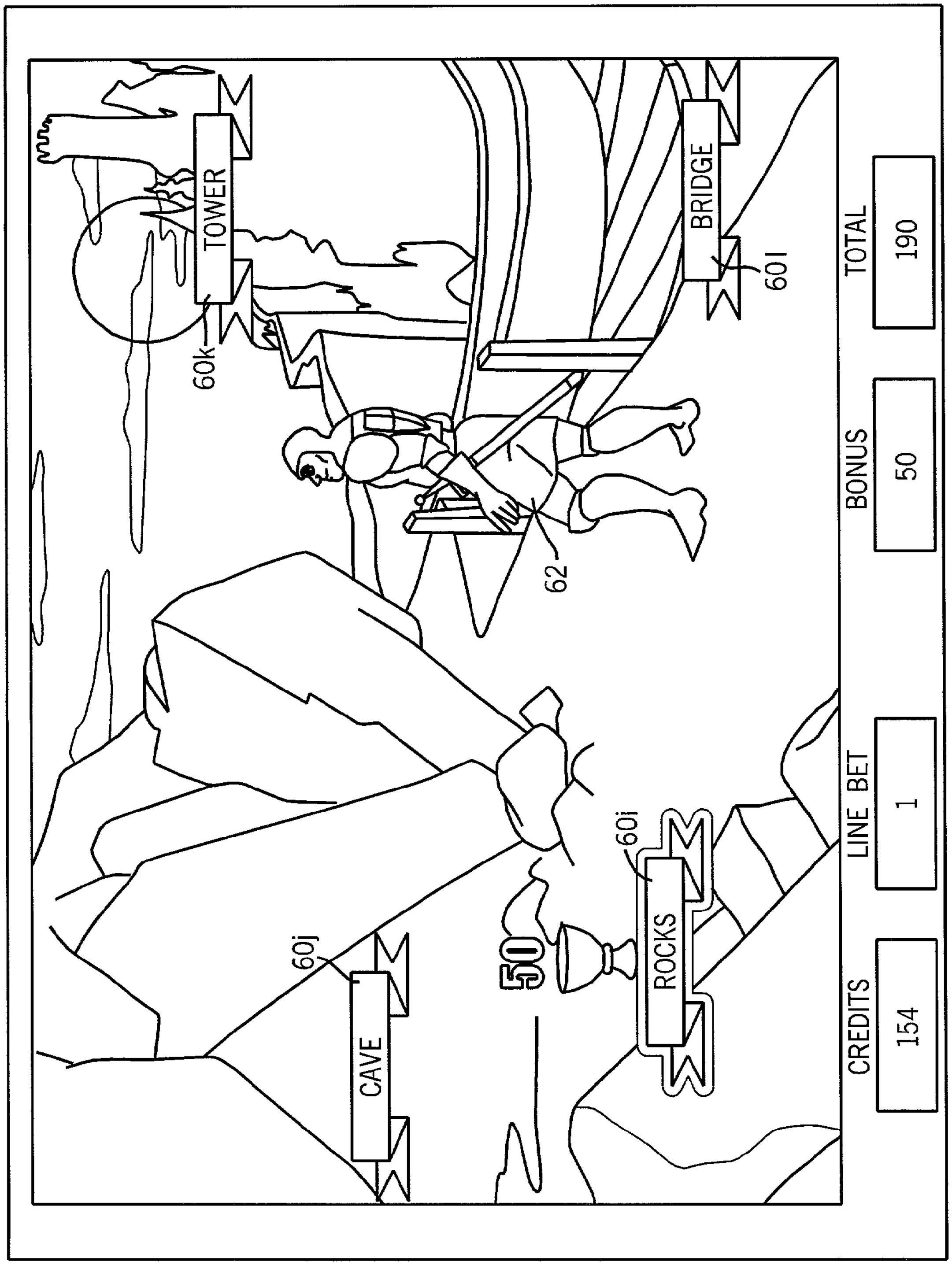
Figure 9:
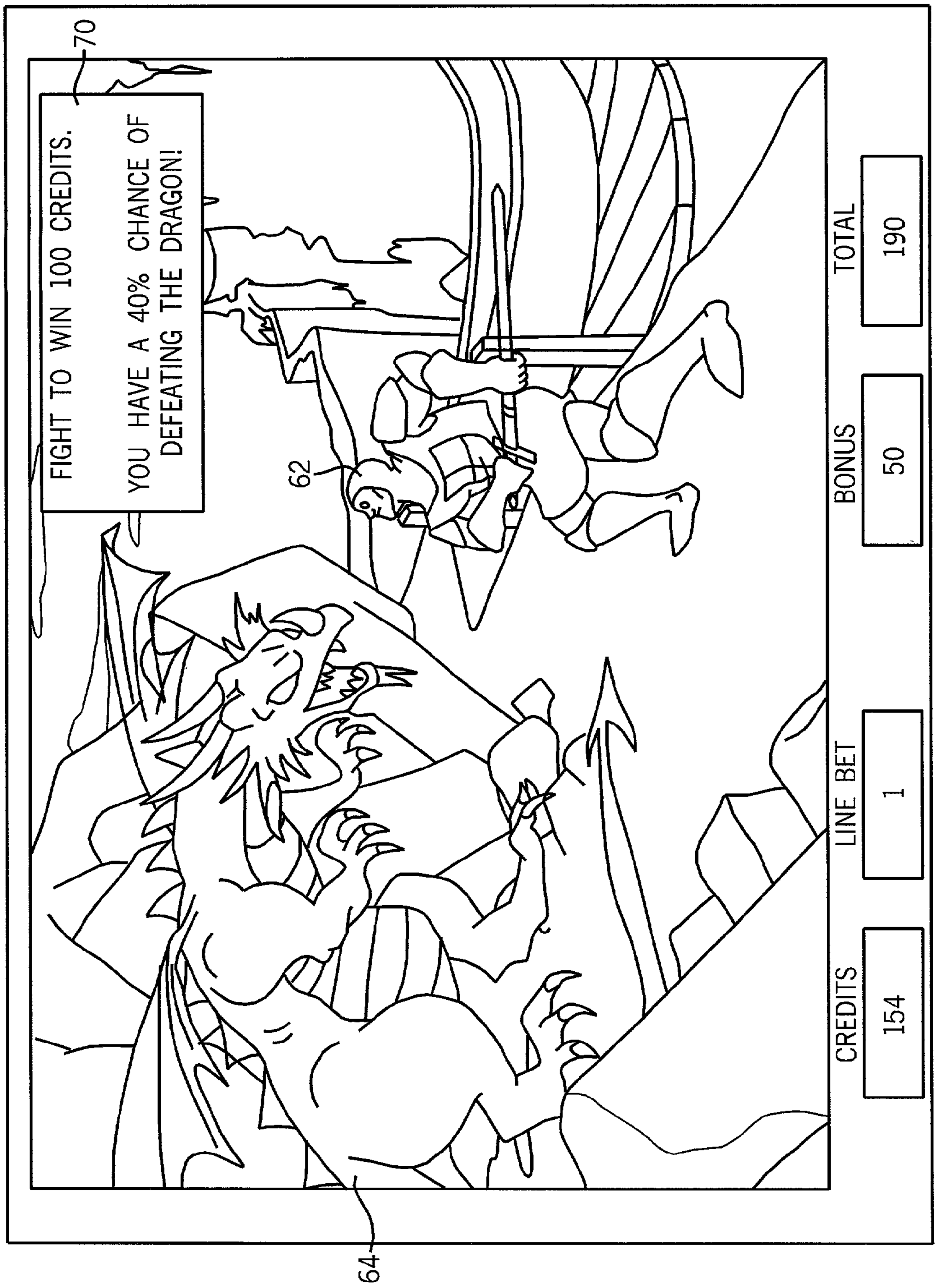

If the player undertakes the risk and the White Knight 62 defeats the enemy character 64 in the second round, the risk/reward feature advances to a third round shown in FIGS. 8 and 9. In the third round the display depicts another outdoor scene including such selectable elements 60 as rocks 60*i,* a cave 60*j,* a tower 60*k,* and a bridge 60*l.* The player selects the rocks 60*i* in FIG. 8, which yields an award of 50 credits. The player then selects the cave 60*j* in FIG. 9, which allows the player to either (1) quit the risk/reward feature and keep the current round's accumulated award of 50 credits, or (2) risk the current round's accumulated award of 50 credits in exchange for the possibility of accumulating another 100 credits, "banking" any awards accumulated during the current round (e.g., 150 credits), and advancing to the next round. Again, the display preferably includes a window 70 indicating the number of credits that can be won and the probability that the risk will yield a successful outcome, i.e., the White Knight 62 will defeat an enemy character 64 such as a dragon. This probability is shown to be 40 percent in the third round.

Figure 10:
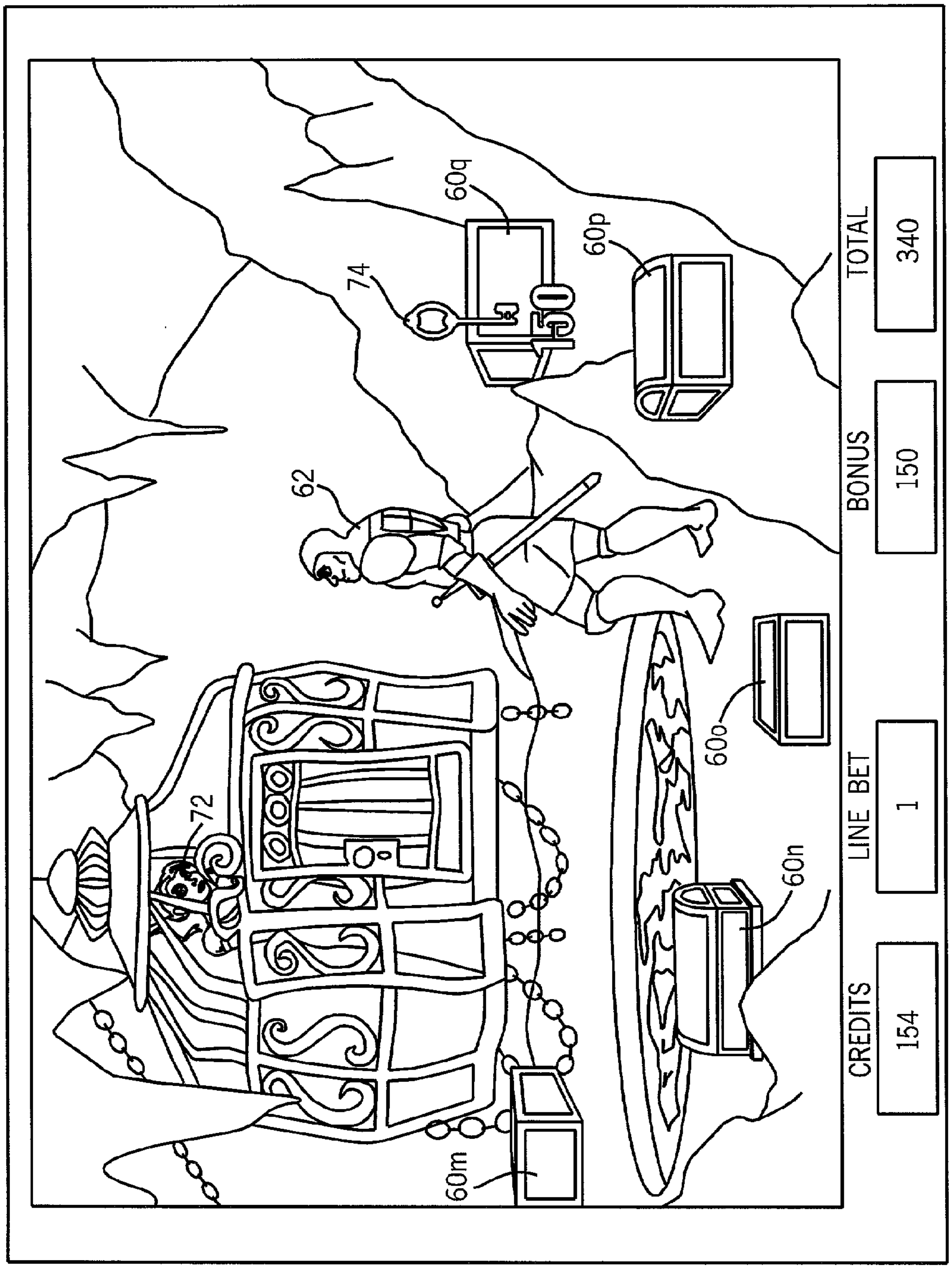

If the player undertakes the risk and the White Knight 62 defeats the enemy character 64 in the third round, the risk/reward feature advances to a final round shown in FIG. 10. In the final round the display depicts a series of selectable chests 60*m,* 60*n,* 60*o,* 60*p,* and 60*q.* The player is prompted to select one of the chests. If the selected chest reveals a key for freeing a Princess 72, the CPU awards a large bonus. In the illustrated example, the selected chest 60*p* does, in fact, reveal a key 74 so that the player is, in turn, awarded a bonus of 150 credits.

At the conclusion of the risk/reward bonus feature, the player is allowed to retain any awards accumulated during prior rounds. The player is also allowed to retain any awards accumulated during a current round if the player either (1) elected to quit the risk/reward feature instead of undertaking a presented risk, or (2) elected to undertake the risk and the risk, in turn, yielded a successful outcome. The player, however, returns any awards accumulated during the current round if the player elected to undertake the risk and the risk, in turn, yielded an unsuccessful outcome. In the illustrated example, the player elected to undertake all the risks and all the risks, in turn, yielded successful outcomes. Specifically, in the first round (FIGS. 4 and 5) the player risked 40 credits and won another 75 credits by overcoming the risk, yielding an award of 115 credits in the first round. In the second round (FIGS. 6 and 7) the player risked 25 credits and won another 50 credits by overcoming the risk, yielding an award of 75 credits in the second round. In the third round (FIGS. 8 and 9) the player risked 50 credits and won another 100 credits by overcoming the risk, yielding an award of 150 credits in the third round. In the final round (FIG. 10) the player won another 150 credits by selecting the correct chest containing the key. Thus, the total award for the risk/reward feature was 490 credits. The CPU then shifts operation back to the basic slot game.

While the present invention has been described with reference to one or more particular embodiments, those skilled in the art will recognize that many changes may be made thereto without departing from the spirit and scope of the present invention. For example, the video simulated reels may be replaced with mechanical reels driven by stepper motors. The basic slot game is played on the mechanical reels, while a separate video display is provided to play the risk/reward bonus feature. In addition, the risk/reward feature may, for example, vary the number of possible rounds, the probability of overcoming a risk in each round, and the amount of the payout that can be won by overcoming the risk. Each of these embodiments and obvious variations thereof is contemplated as falling within the spirit and scope of the claimed invention, which is set forth in the following claims.

What is claimed is:

1. A gaming machine comprising:

a wagering apparatus for receiving a wager from a player;

a risk/reward feature, under processor control, for accumulating awards over a plurality of rounds, presenting the player with an option to undertake a risk of all of the awards accumulated during a current one of the rounds, and awarding all of the awards accumulated during the rounds prior to the current one of the rounds following an unsuccessful outcome in response to the undertaking of said risk.

2. The machine of claim 1, wherein the option allows the player to either undertake the risk of any of the awards accumulated during the current one of the rounds, or quit the risk/reward feature and retain any of the awards accumulated during the current one of the rounds.

3. The machine of claim 2, wherein if the player elects the option to undertake the risk of any of the awards accumulated during the current one of the rounds:

the risk/reward feature advances to a next round if the risk yields a successful outcome, or the risk/reward feature ends and eliminates any of the awards accumulated during the current one of the rounds if the risk yields an unsuccessful outcome.

4. The machine of claim 1, wherein each of the rounds includes a plurality of elements selectable by the player.

5. The machine of claim 4, wherein the selectable elements are associated with the risk or a non-risk outcome.

6. The machine of claim 5, wherein the non-risk outcome includes an award.

7. The machine of claim 3, wherein the risk includes an animated fight between a first character and a second character, the risk yielding the successful outcome if the first character defeats the second character, the risk yielding the unsuccessful outcome if the second character defeats the first character.

8. The machine of claim 5, wherein the risk includes an animated fight between a first character and a second character, the risk yielding a successful outcome if the first character defeats the second character, the risk yielding an unsuccessful outcome if the second character defeats the first character.

9. The machine of claim 1, further including a basic game, under processor control, including a start-feature outcome for triggering the risk/reward feature.

10. The machine of claim 9, wherein the basic game includes a plurality of symbol-bearing reels that are rotated and stopped to place symbols on the reels in visual association with a display area.

* * * * *